United States Patent [19]
Latimer

[11] Patent Number: 5,560,782
[45] Date of Patent: Oct. 1, 1996

[54] METHOD AND APPARATUS FOR TREATING ARTICLES WITH WASH WATER OR OTHER FLUID

[76] Inventor: Douglas Latimer, 157 Mercury Rd., Rexdale, Ontario, Canada, M9W 3H7

[21] Appl. No.: 172,353

[22] Filed: Dec. 23, 1993

Related U.S. Application Data

[62] Division of Ser. No. 909,342, Jul. 6, 1992, Pat. No. 5,423,339.

[51] Int. Cl.⁶ .................................................. B08B 17/04
[52] U.S. Cl. ........................... 134/10; 134/123; 134/201; 134/111
[58] Field of Search ..................... 134/111, 123, 134/201, 10; 119/106; 141/114; 137/312; 238/2

[56] References Cited

U.S. PATENT DOCUMENTS

| | | | |
|---|---|---|---|
| 1,617,968 | 2/1927 | Spicer | 220/573 |
| 1,694,197 | 12/1928 | Woodling | 220/573 |
| 1,719,055 | 7/1929 | Herzer . | |
| 3,445,973 | 5/1969 | Stone . | |
| 3,773,255 | 11/1973 | Schoulties et al. . | |
| 4,010,896 | 3/1977 | Stockton . | |
| 4,229,303 | 10/1980 | Heinrich et al. . | |
| 4,279,263 | 7/1981 | Pulliam . | |
| 4,300,721 | 11/1981 | Rich . | |
| 4,484,661 | 11/1984 | Evenson | 220/573 |
| 4,765,775 | 8/1988 | Kroger . | |
| 4,799,821 | 1/1989 | Brodersen . | |
| 4,802,322 | 2/1989 | Bendfeld . | |
| 4,923,052 | 5/1990 | Englebert | 220/573 |
| 4,981,391 | 1/1991 | Klementovich . | |
| 4,988,234 | 1/1991 | Henkel et al. . | |
| 5,090,588 | 2/1992 | Van Romer et al. . | |
| 5,099,872 | 3/1992 | Tarvin et al. | 141/114 |
| 5,152,843 | 10/1992 | McDonald et al. | 134/21 |
| 5,205,306 | 4/1993 | Peterson | 134/190 |

FOREIGN PATENT DOCUMENTS

| 1242115 | 6/1967 | Germany | 134/123 |
|---|---|---|---|

OTHER PUBLICATIONS

Landa, Inc. "Water Maze Delta" (product brochure, publication date unknown).
Aero Tec Laboratories Inc. "Port–A–Berm" (product brochure, publication date unknown).
Thermafab, Inc. "Troubleshooter" (product brochure, publication date unknown).

Primary Examiner—Frankie L. Stinson
Attorney, Agent, or Firm—Bereskin & Parr

[57] ABSTRACT

The invention provides a method for washing an article and collecting the used wash water as well as a wash pad and a mobile apparatus. A wash truck is modified to include a water treatment unit and a submersible pump for removing used wash water from a water-proof surface, such as pavement or the wash pad. The used wash water is subsequently recycled and reused or disposed of without harm to the environment. The wash pad includes a bottom sheet and a containment wall that together define a containment area for containing the used wash water. A secondary containment area may be defined for wash pads that are used for the washing of vehicles. The wash pad may be rolled for storage upon a reel mounted to the wash truck. Other embodiments provide wash pads for use in washing rail-mounted articles, and the interiors of trailers and shipping containers.

10 Claims, 9 Drawing Sheets

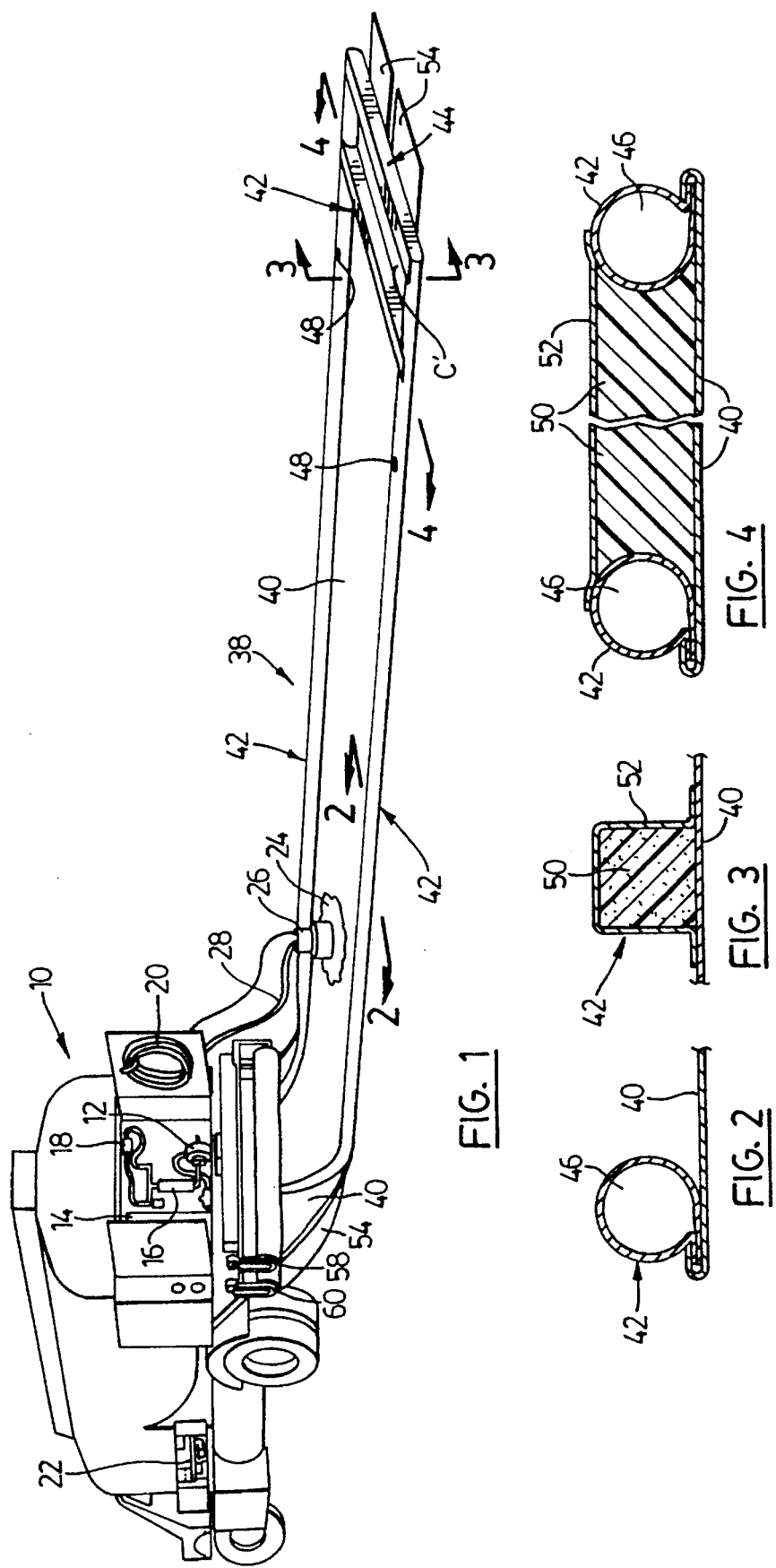

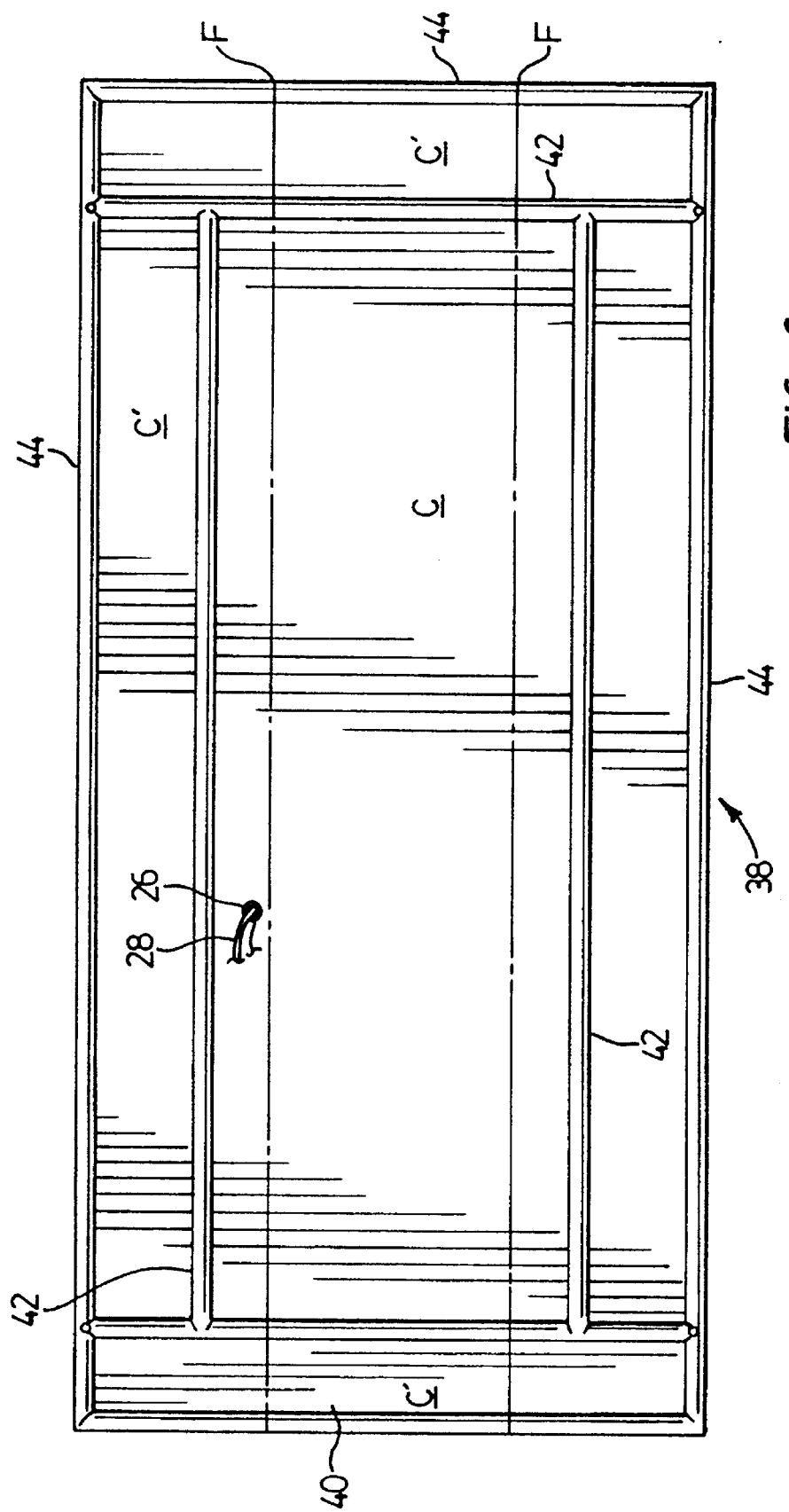

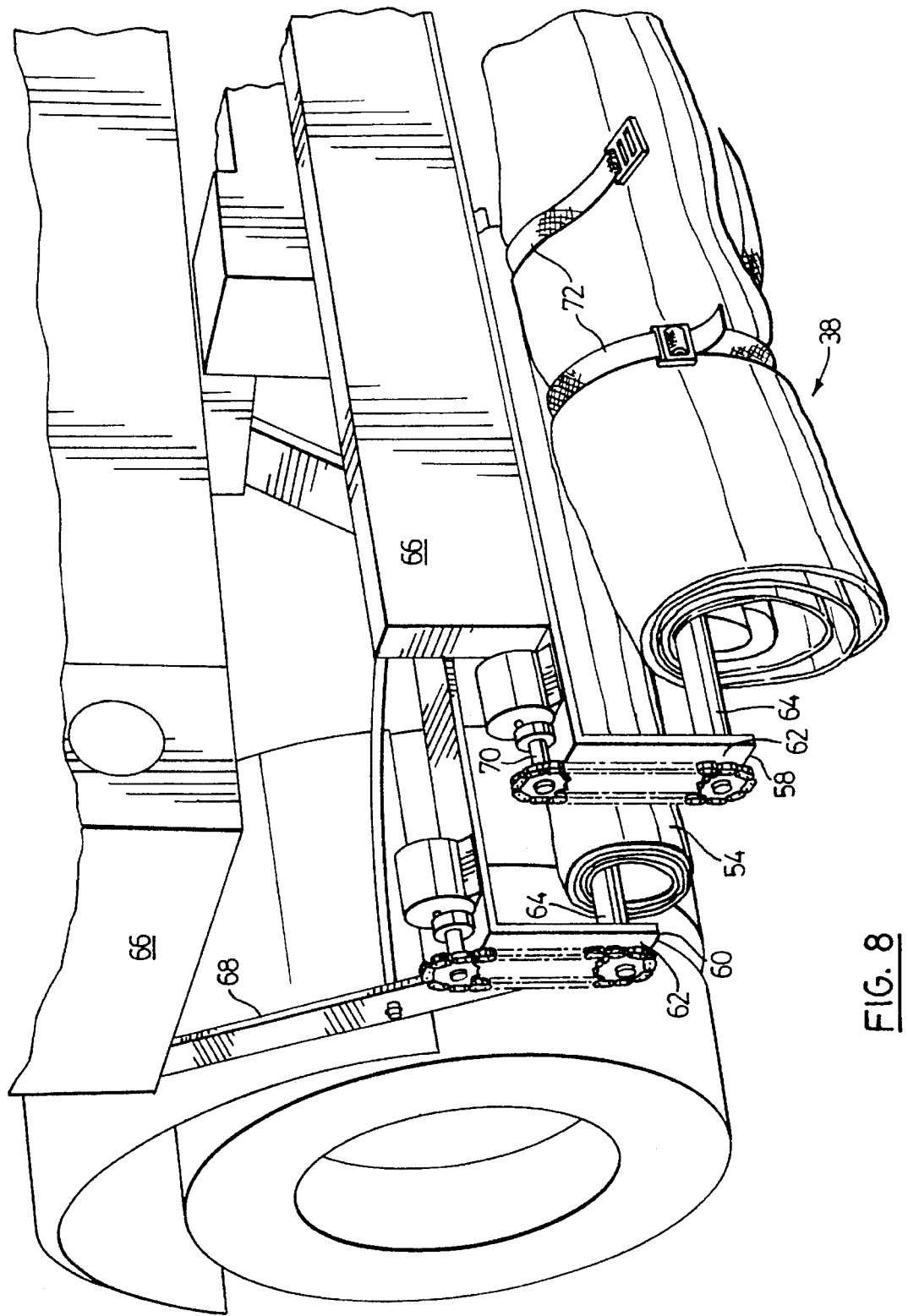

5,560,782

METHOD AND APPARATUS FOR TREATING ARTICLES WITH WASH WATER OR OTHER FLUID

This is a division, of application Ser. No. 07/909,342 filed Jul. 6, 1992 now U.S. Pat. No. 5,423,329.

FIELD OF THE INVENTION

The present invention relates to the treatment of articles with a fluid, such as a washing of vehicles and other large articles with a spray washer. In particular, the invention relates to a wash pad, a mobile apparatus and a method for washing an article and collecting the used wash water for subsequent recycling or disposal in an environmentally safe manner.

BACKGROUND OF THE INVENTION

Commercial car and truck washing has become a focus of public concern and government regulation recently over the disposal of used wash water into municipal sewer systems or directly into the ground. The combination of soap, oil, dirt, and other chemicals in the used wash water can be harmful to the environment if allowed to drain into a sewer or seep into the earth.

Many car and truck wash facilities have now installed built in reservoirs for containing the used wash water resulting from a vehicle wash. The used wash water is collected from these reservoirs and disposed of in an approved manner or recycled through a water cleaning system. However, similar used wash water containment procedures do not currently exist in the portable washing industry.

Portable spray washers have been used for years to clean industrial and commercial vehicles, buildings, sites, structures, and trailers or other shipping containers. These washers typically consist of a wash truck having a large water storage tank to provide a water supply. The truck typically carries its own spray wash equipment including water heaters, high pressure pumps, water softeners, soap injectors, sprayers, and hoses.

Most locations where a portable washer is used do not have built-in reservoirs or other means to contain and collect the used wash water. What is needed is a portable system that contains and collects the used wash water for recycling or disposal in an environmentally safe manner.

SUMMARY OF THE INVENTION

The invention described below cleverly facilitates the washing of articles at remote sites. Used wash water is collected either directly from the surface at the site or from a wash pad that is provided to contain the used wash water. The used wash water is then transferred to a receptacle or directly to a water treatment unit.

In a first aspect, the invention provides a method for washing an article at a site and collecting the used wash water that drains therefrom, comprising the steps of:

(a) providing a wash vehicle at said site, said wash vehicle having a wash water supply tank, a wash water applicator, a collection receptacle, and a wash pad rolled upon a wash pad reel, said wash pad having a waterproof bottom sheet and a containment wall sealingly connected to said bottom sheet, said wall and said bottom sheet together defining a containment area for containing used wash water;

(b) deploying said wash pad from said reel;

(c) washing said article such that the used wash water is contained in said containment area;

(d) removing said used wash water from said containment area with a removal means; and (e) transferring said used wash water with a conduit to said collection receptacle.

Preferably, the receptacle comprises a water treatment unit for cleaning the used wash water. When washing a vehicle, a second containment area is provided to contain used wash water that may flow from the first containment area when the vehicle enters or exits the wash pad. An underlay sheet may also be provided to protect the wash pad from being punctured by sharp objects.

In a second aspect, the invention provides a apparatus for use in applying a fluid to an article and collecting used fluid, comprising:

a containment pad having a fluid impermable bottom sheet., and at least one fluid impermable wall in the form of an extended sheet integrally connected to said bottom sheet, said at least one wall and said bottom sheet providing a trough-like configuration to define a containment area; a containment pad reel for storing said wash pad, said reel having a bracket that supports an axle, with said containment pad being rolled about said axle, and said reel being mountable to a carrier; an attachment means extending from said containment pad for closely attaching said containment pad to such an article such that said containment pad extends between said article and said carrier in said trough-like configuration.

In a third aspect, the invention provides a mobile apparatus for applying a fluid to articles and collecting used fluid, said apparatus comprising:

a vehicle;

a fluid water supply tank mounted to said vehicle;

a fluid water applicator mounted to said vehicle and fluidly connected to said tank;

a used fluid water receptacle mounted to said vehicle, said receptacle having an inlet;

a flexible conduit fluidly connected to said inlet;

a removal means for collecting used fluid water and conducting said used fluid water through said conduit to said inlet; and a flexible containment pad removably stored upon a reel mounted to said vehicle, said containment pad having a fluid impermeable bottom sheet and at least one fluid impermeable wall sealingly connected to said bottom sheet, said at least one wall and said bottom sheet together containing a containment area for containing used fluid to be collected with said removal means.

Preferably a containment pad and a wash pad reel are mounted to the vehicle along with a water treatment unit.

BRIEF DESCRIPTION OF THE DRAWINGS

For a better understanding of the present invention, and to show more clearly how it may be carried into effect, reference will now be made, by way of example, to the accompanying drawings. The drawings show preferred embodiments of the present invention, in which:

FIG. 1 is a perspective view of a wash truck with a wash pad and two underlays extending from reels mounted to the rear of the truck;

FIG. 2 is a partial sectional view of the wash pad along line 2—2 in FIG. 1;

FIG. 3 is a partial sectional view of the wash pad along line 3—3 in FIG. 1;

FIG. 4 is a partial sectional view of the wash pad along line 4—4 FIG. 1;

FIG. 6 is a top view of another embodiment of the wash pad;

FIG. 8 is an enlarged partial perspective view of the rear of a wash truck showing the underlay and wash pad rolled onto the reels;

DETAILED DESCRIPTION OF THE PREFERRED EMBODIMENT

Figure 5:
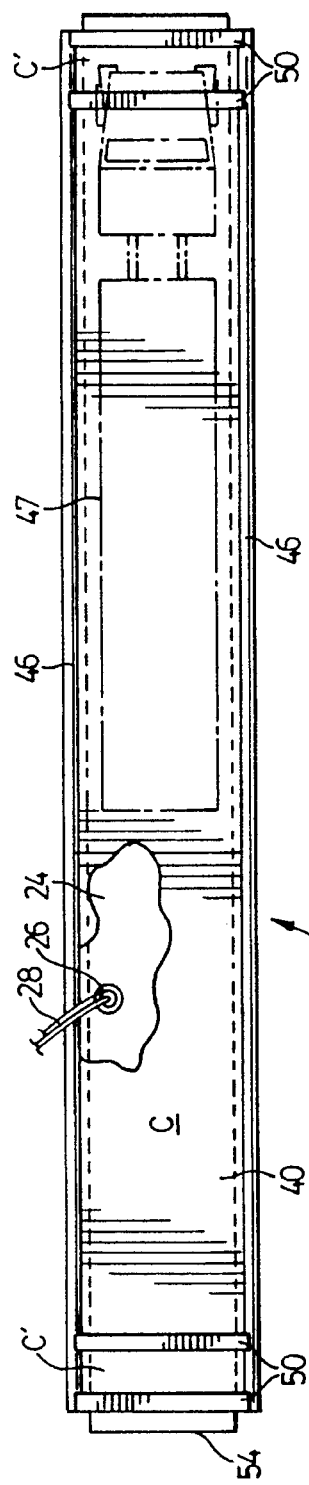
FIG. 5 is a top view of one embodiment of a wash pad and underlay showing a tractor-trailer vehicle in phantom exiting the wash pad.

The preferred embodiment described herein is directed primarily to the washing of articles with a soapy wash water solution. It would be appreciated by one skilled in the art that the invention has a range of alternate uses. For instance, the invention may be directed to the problem of containing and collecting de-icing fluids that have been applied to the wings of airplanes. The size and construction of the elements of the invention described below would vary according to the parameters of the alternate use.

Wash Truck

A mobile apparatus in the form of a wash truck that has been modified for use with the present invention is shown generally at 10 in FIG. 1. Alternatively, the mobile apparatus 10 may be a truck-and-trailer unit, or any other vehicle suitable for the purposes described below.

A rear compartment of the wash truck 10 houses an assortment of spray wash equipment including a high pressure pump 12, a water heater 14, a water softener 16, a soap injector 18, a wash water applicator (not shown), and an assortment of hoses 20. The high pressure pump 12 is floor mounted and is driven by a power take-off from the wash truck 10. The pump provides a water flow of five gallons per minute at a pressure of 3,000 psi and a temperature of up to 210° F.

The wash truck 10 is modified to include a water treatment unit 22. The water treatment unit 22 preferred for use with the present invention is the Delta (trade mark) unit of the WATER MAZE (trade mark) cleaning system manufactured by Landa, Inc. of Portland, Oreg. The treatment unit includes means for separating oil and filtering dirt particles, heavy metals, pesticides, solids, and other hydrocarbons from a used wash water 24 resulting from the wash of an article. The resulting "clean" water exiting the water treatment unit 22 is reused or disposed of in a conventional manner.

A pH meter (not shown) is provided at the wash truck 10 to regulate the pH of the wash water being reused or disposed. In the municipality of Metropolitan Toronto, By-law 153–89 provides that water having a pH of less than 6.0 or greater than 9.0 may not be discharged into storm sewers or the like. The pH of the water is adjusted in a conventional manner through the addition of either an acidic or basic substance.

A water removal means in the form of one or more vacuum pumps or submersible pumps 26 is included with the wash truck 10 to collect the used wash water 24. The pumps and the water treatment unit 22 are powered by an electric generator (not shown) mounted to the wash truck 10. Used wash water 24 collected by the pump is transferred to the water treatment unit 22 on the wash truck 10 through a flexible conduit 28.

Alternatively, if the wash truck 10 is not equipped with a water treatment unit 22, the used wash water 24 is transferred through the conduit 28 to a receptacle (not shown) carried by the wash truck 10 or another vehicle, for subsequent treatment or for disposal to a sanitary sewer that satisfies municipal discharge by-laws.

Figure 13:
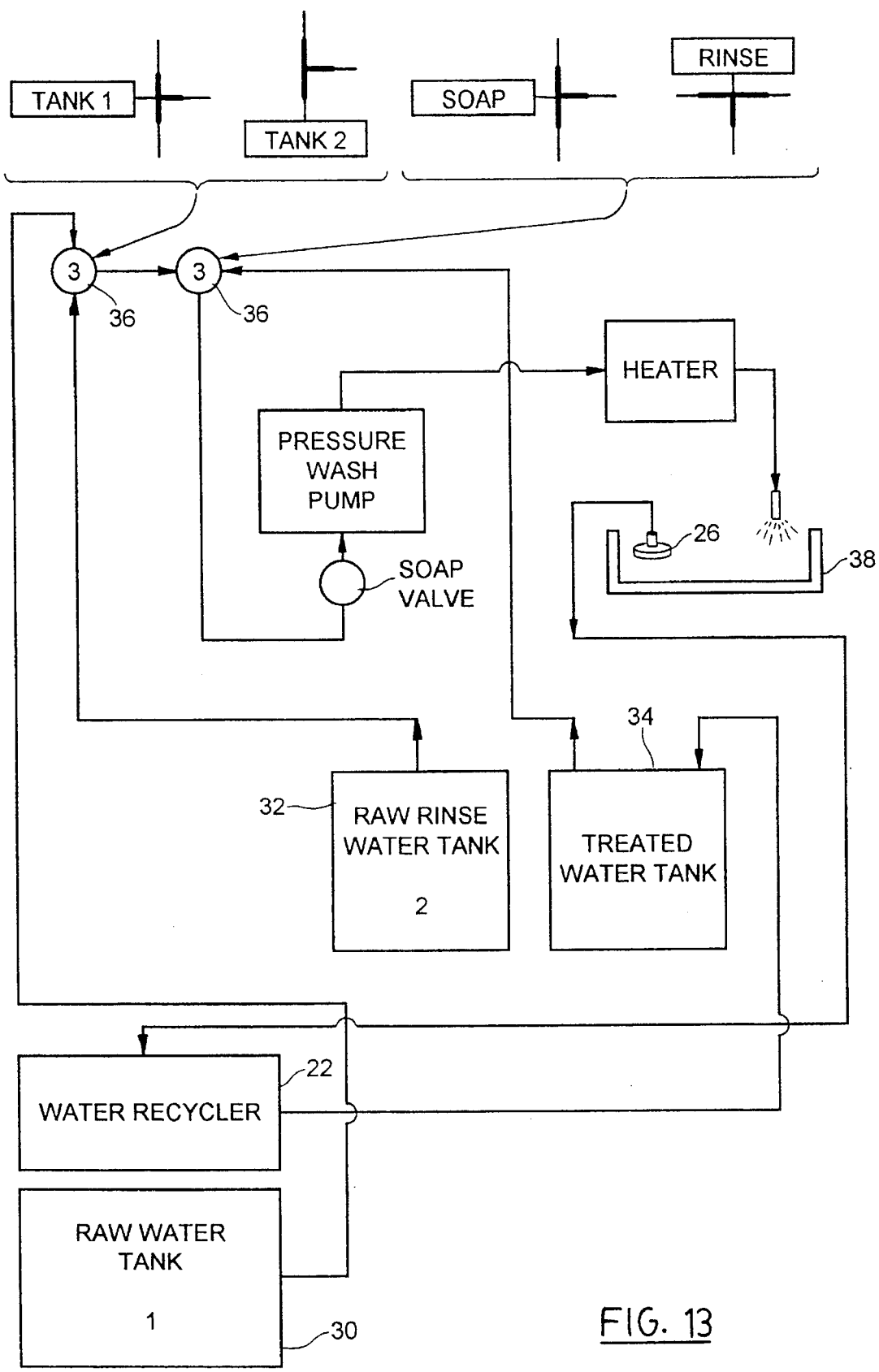
FIG. 13 is a schematic representation of the arrangement of pipes and water tanks for the water treatment unit and spray wash equipment.

FIG. 13 is a schematic representation of an arrangement of pipes and water supply tanks for the water treatment unit 22 and spray wash equipment. As shown, the wash truck 10 includes a first raw water tank 30 of approximately 400 gallons, a second raw water tank 32 of approximately 200 gallons, and a treated water tank 34 of approximately 500 gallons. A series of three-way ball valves 36 are used to direct water from the appropriate tank to the spray washing equipment. A single, larger capacity raw water tank can be substituted for tanks 30 and 32, depending upon the available space on the wash truck 10. The treated water tank 34 contains used wash water 24 that has passed through the water treatment unit 22. As noted above, the pH of the treated used wash water is monitored with the pH meter.

Vehicle Wash Pad

A wash pad is shown generally at 38 in FIG. 1. The embodiment depicted is intended primarily for use in combination with the wash truck 10. The wash pad 38 may be used on its own however (FIGS. 5 or 6) in combination with a spray washer unit and a removal means to transfer the used wash water to a water treatment unit. The wash pad 38 may be constructed in an assortment of shapes and sizes depending upon its application. Several examples of wash pad 38 embodiments for specific applications are provided below.

The wash pad 38 includes a bottom sheet 40 made of a flexible, durable, water-proof material such as vinyl. A twenty-eight ounce vinyl is considered sufficiently durable for most applications. Other durable materials, such as a heavy gauge rubber material, may also be used. The material should be flexible in order that the wash pad 38 may be folded, collapsed, or rolled for storage when the wash pad 38 is being transported to another site. The bottom sheet 40 may be heated for winter use to prevent used wash water from freezing upon the wash pad 38.

The wash pad 38 also includes a primary containment wall 42 that, together with the bottom sheet 40, defines a containment area C for containing the used wash water 24.

Figure 7:
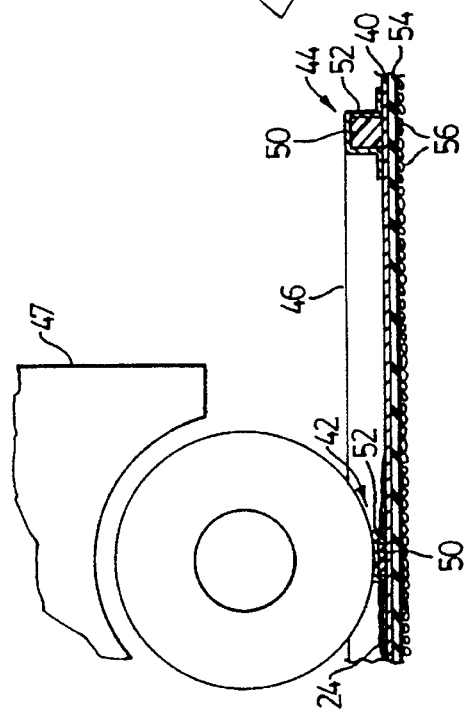
FIG. 7 is a partial sectional view of the wash pad, underlay and vehicle along line 7—7 of FIG. 5.

The wash pad embodiment shown in FIGS. 1 and 5 further includes a secondary containment wall 44 that, together with the bottom sheet 40 and the primary wall 42, defines a secondary containment area C' for containing any used wash water 24 that flows from the containment area C when the containment wall 42 is deformed due to the entry or exit of a vehicle 47 from the pad. FIGS. 5 and 7 show a tractor-trailer vehicle 47 exiting the wash pad 38, with FIG. 7 showing the containment wall 42 deforming and the used wash water 24 flowing into the secondary containment area C'.

The containment walls 42, 44 are flexible to permit storage of the wash pad 38. In addition, the walls 42, 44 are resiliently deformable at the vehicle entry and exit points.

The containment walls 42, 44 are primarily formed from an inflatable tube 46 that is sealingly connected to the bottom sheet 40. The walls 42, 44 have a height of around five inches when inflated. FIG. 2 shows a cross-sectional view of the containment wall 42 along the lines 2—2 in FIG. 1. As may be seen, the tube is a separate material that is folded upon itself and stitched and sealed to the edge of the bottom sheet 40. Alternatively, the tube may be integral with the bottom sheet 40 where the edge of the bottom sheet 40 is folded over and stitched and sealed to itself. It is also contemplated that the bottom sheet 40 and walls 42, 44 may be separate units. In this case, the walls 42, 44 must rest upon the bottom sheet 40 such that a sealed connection is established.

The tube includes releasable closures 48 that allow it to be inflated with air or water supplied by the wash truck. The closures 48 may be released to deflate the tube to allow the wash pad 38 to be collapsed and stored. Optionally, a separate air insertion valve (not shown) may be provided to simplify inflation of the tube. Such valves are commonly used for inflating tires, or other inflatable items. In this case, the releasable closure 48 additionally acts as a safety against over inflation of the tube.

While the containment walls 42, 44 may be formed exclusively with the inflatable tube, it is preferred that certain portions of the walls 42, 44 be formed with a more durable material. Heavy travel areas, such as the points where vehicles 47 enter and exit the wash pad 38, are thus formed with sponge or another durable material. The sponge portions 50 of the containment walls 42, 44 may then be replaced if they become worn or damaged without effecting the integrity of the remainder of the walls 42, 44 such as the inflatable tubes.

FIG. 3 shows a cross-sectional view of a sponge portion of the secondary containment wall 44 as taken along the line 3—3 in FIG. 1. A length of sponge material having a height of approximately five inches is encased with a cover 52 made from a durable material such as the vinyl used for the bottom sheet 40. The cover 52 is sealingly connected to the bottom sheet 40 by a vinyl welding process. Optionally, a releasable closure such as a zipper or a hook-and-loop fastener is included along the length of the cover 52 in order that a replacement sponge may be inserted when the present sponge becomes worn or damaged. The cover 52 of the sponge portion is vinyl welded to the inflatable tube in the manner shown in FIG. 4.

The secondary containment areas C' of the wash pad 38 shown in FIGS. 1 and 5 are located at the ends of the wash pad 38 to allow entry and exit of vehicles 47. Deformation of the containment wall 42 along the sides of the wash pad 38 between the secondary containment areas C' is to be avoided as it would result in the used wash water 24 flowing from the wash pad 38 to the ground.

An alternative embodiment of the wash pad 38 is shown in FIG. 6. In this embodiment, the secondary containment area C' surrounds the containment area C. This embodiment allows vehicles 47 to be driven onto the wash pad 38 either lengthwise or widthwise. The advantage of the embodiment shown in FIG. 6 is that several vehicles 47 may be placed side-by-side along the width of the wash pad 38. This increases the number of vehicles 47 that may be washed at one time and thus improves the efficiency of the washing operation. This embodiment is bulkier than the FIG. 5 embodiment however, and requires more effort to fold and store.

The wash pad 38 depicted in FIG. 5 has a width of approximately thirteen feet and a length of approximately seventy-five feet. The wash pad 38 depicted in FIG. 6 has a width of approximately thirty-five feet and a length of approximately seventy-five feet. Either of these embodiments may be folded along fold lines F, as shown in FIG. 6, and rolled upon reels (described below) or otherwise stored.

An underlay 54, as shown in FIGS. 1, 5 and 7, is provided for use beneath the wash pad 38. This is recommended where the wash pad 38 would otherwise be resting upon stones or other sharp objects 56 that could puncture the bottom sheet 40. The underlay 54 is constructed from a heavy gauge material that is extremely durable and puncture-resistant. The preferred material has a base fabric of polyester and a specific weight of about $40(\pm)2$ ounces per square yard.

While it is conceivable that the underlay 54 may be secured to the underside of the bottom sheet 40 with glue or another attachment means, it has been found that a separate underlay is preferable. The underlay material is generally heavy and would effect the flexibility and portability of the wash pad 38. Also, the underlay 54 is not always necessary in instances where the wash pad 38 is resting upon a smooth surface such as pavement.

As shown in FIG. 1, two underlays 54 having a width of approximately forty-three inches and a length of ninety feet are provided. These are arranged beneath the wash pad 38 to act as tracks for the vehicles 47 being driven onto the wash pad 38. A single, wider sheet of underlay material may be used instead; however, suitable wider materials are not known to be readily commercially available.

Figure 9:
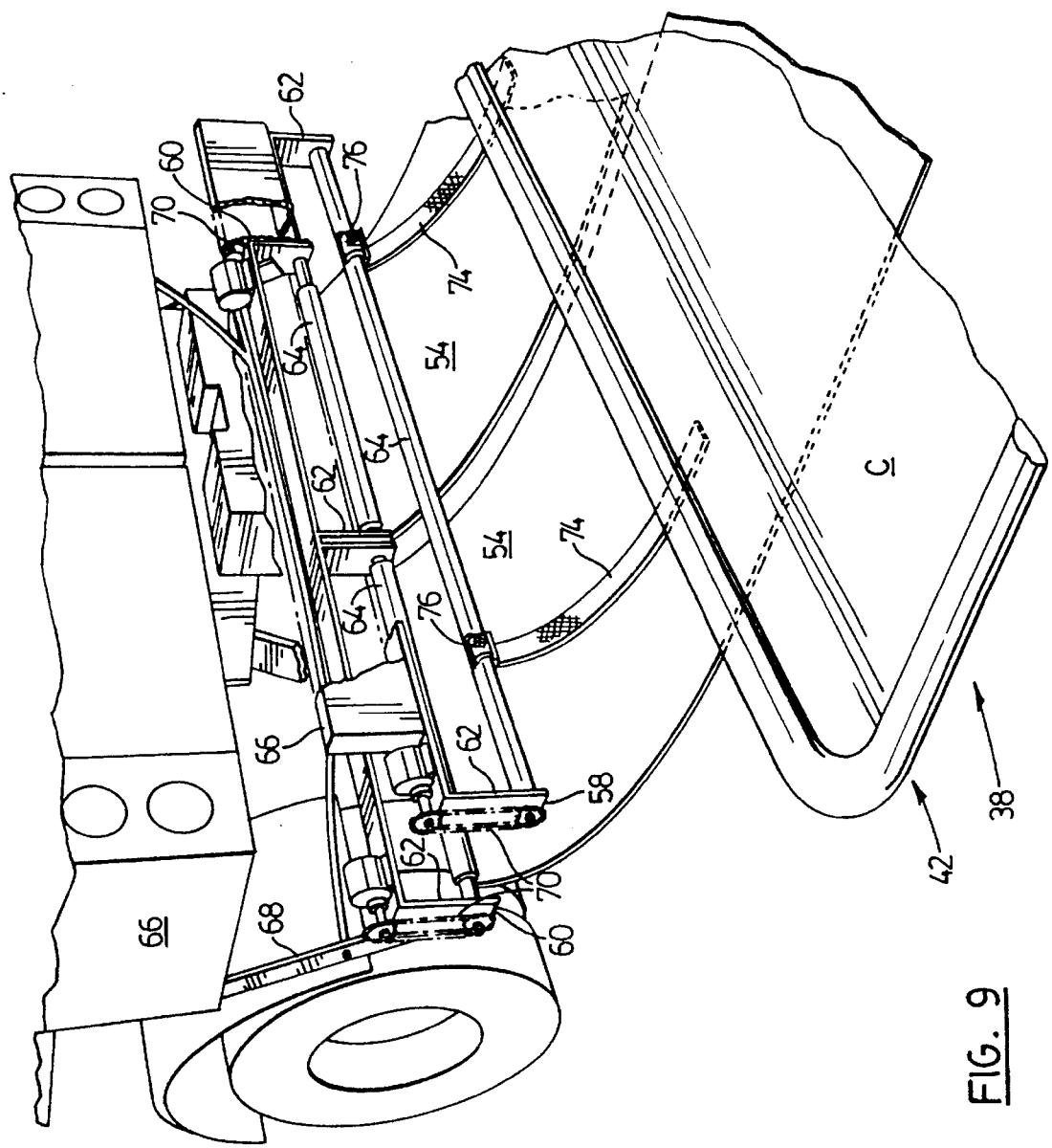
FIG. 9 is an enlarged partial sectional perspective view of the rear of a wash truck showing the wash pad and underlay unrolled from the reels.

As shown in FIGS. 1, 8 and 9, the wash pad 38 and underlays 54 may be stored on reels 58 and 60 suspended from the wash truck 10. The reels 58 and 60 each include a bracket 62 that supports an axle 64. The bracket 62 is fixed to the frame rail 66 of the wash truck 10 either directly or with braces 68. The axle 64 is driven by a winch 70, that may be manually powered or motorized.

Alternatively, the reels 58 and 60 may be suspended from a carrier (not shown) that is kept at the wash site. The carrier may have wheels and be movable such that the wash pad 38 and underlays 54 may be deployed where desired at the wash site. Another arrangement may have the carrier mounted to a loading dock or other permanent location for subsequent deployment of the wash pad 38 and underlays 54.

As shown in FIG. 8, belts 72 are used to secure the wash pad 38 and underlays 54 about their respective reels 58, 60, as shown in FIG. 9. Straps 74 are attached between the wash pad 38 and slots 76 located in the axle 64. The straps 74 facilitate the rolling of the wash pad 38 onto the wash pad reel 58 for subsequent storage.

For semi-permanent installation of the wash pad 38 at the wash site, with the underlays 54, the wash pad 38 may be secured to the ground with pegs (not shown) extending through eyelets (not shown) located on the bottom sheet 40 along the exterior of the containment walls 42, 44.

Operation of Wash Truck and vehicle Wash Pad

In use, the wash truck 10 equipped with the wash pad 38 and underlays 54 is driven to a site where a company's trucks, vans or other vehicles 47 are parked. If the site has a rough surface, the wash truck operator unrolls the underlays 54 from the underlay reels 60 and also unrolls the wash pad 38 from the wash pad reel 58. If the surface is smooth, the wash pad 38 may be deployed directly onto the wash site although, use of the underlays 54 is generally recommended.

Care should be taken to ensure that the underlays 54 are spaced to support the portions of the wash pad 38 that will be travelled upon by the vehicles 47 being washed. The spacing of the underlay reels 60, as shown in FIG. 9, is such that the underlays 54 are deployed at the correct width to support most large vehicles 47.

Once the wash pad 38 is unrolled the containment walls 42, 44 are inflated with air supplied by an air compressor (not shown) located on the wash truck 10. When the walls 42, 44 have been inflated to a height of about five inches the wash pad 38 is ready for use.

A vehicle 47 is driven over the secondary containment wall 44 onto the wash pad 38 in preparation for being washed. The submersible pump 26 is placed upon the wash pad 38 in an area where the wash water is likely to collect. The wash pad 38 may be constructed with a sloping bottom sheet 40 such that the used wash water 24 is directed to an area of the pad 38 for collection.

The vehicle 47 is then washed in a conventional manner using hot water and soap with a raw water rinse. As discussed earlier, the wash water used during the soap stage will in fact be recycled wash water if desired. While the vehicle 47 is being washed, the pump removes the used wash water 24 from the wash pad 38 and transfers the used wash water 24 through the conduit 28 to the treatment unit for recycling. Solids that collect upon the wash pad 38 may be removed with a plastic shovel or the like.

When the vehicle wash is complete, the vehicle 47 is driven from the pad over the secondary containment wall 44 and the next vehicle 47 may be washed.

When the washing operation is complete and the used wash water 24 collected, the underlays 54 and the wash pad 38 are rolled onto their respective reels 60 and 58 with the assistance of the winches 70.

The pad shown in FIG. 5 is capable of holding at least one vehicle although several vehicles of shorter length may be lined in "single file" on the pad. The pad shown in FIG. 6 is wider and may hold a number of vehicles across its width. With either pad configuration, vehicles may be continually washed and driven from the pad as the used wash water 24 is collected by the pump and transferred to the treatment unit for recycling.

Other Wash Pad Applications

Other embodiments of the wash pad 38 may be used for specific applications such as cleaning the interior of trailers and shipping containers or cleaning rail-mounted articles.

(a) Trailer Wash

Figure 10:
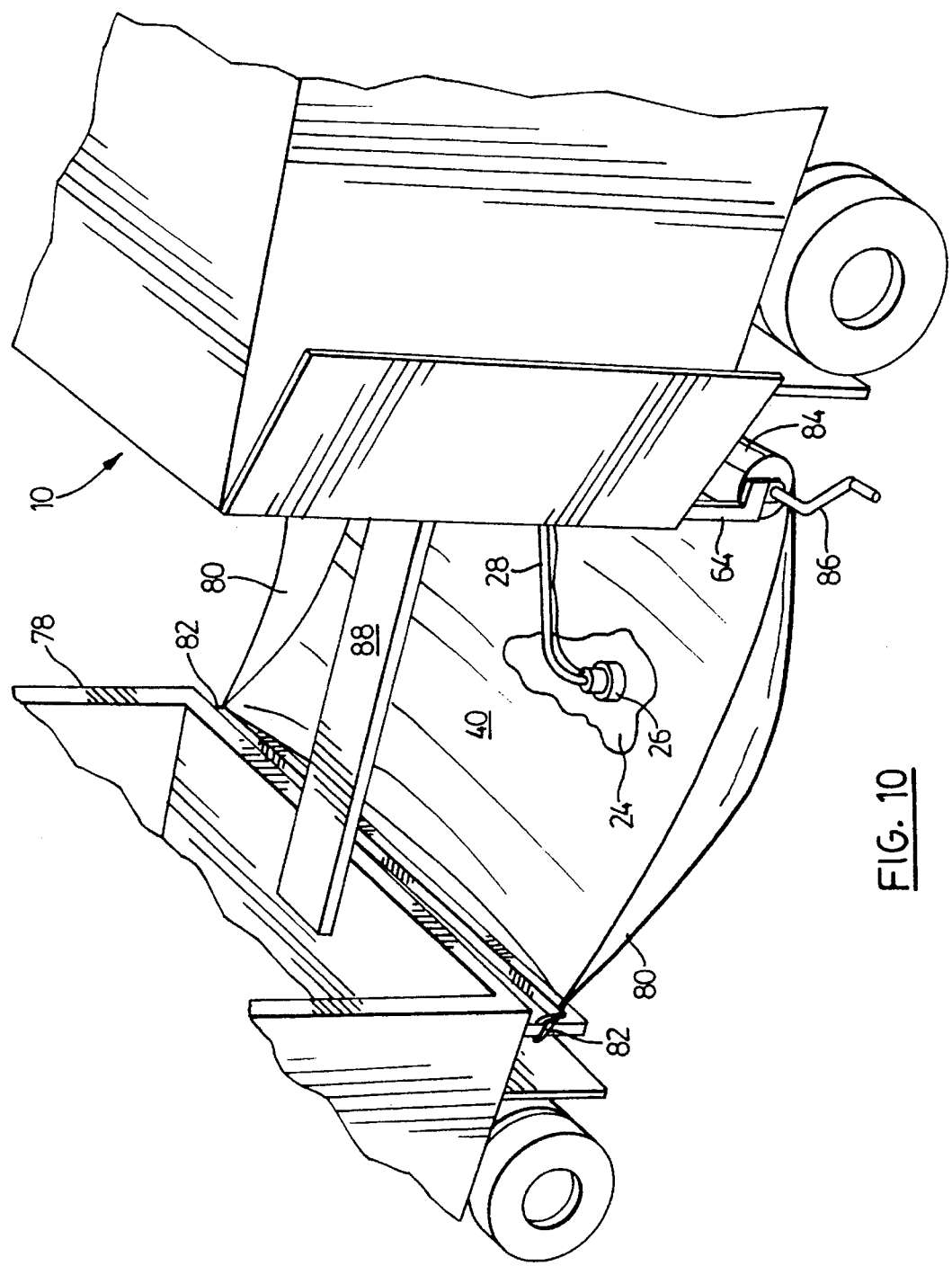
FIG. 10 is a partial perspective view of a wash truck and a trailer with another embodiment of a wash pad extending therebetween.

The wash pad 38 depicted in FIG. 10 is intended for use in washing the interior of trailers 78 and other articles similarly above ground level. The wash pad 38 includes a bottom sheet 40 and containment walls 42 which together define a containment area C that resembles a trough. The containment walls 42 of this embodiment are extended sheets 80 that are integral with the bottom sheet 40 and shaped into a trough-like configuration. The wash pad 38 includes an attachment means 82 such as an elastic cord and hook for suspending one end of the wash pad 38 from the trailer.

The other end of the wash pad 38 is attached to a wash pad reel 84 suspended from the wash truck 10 by a brace similar to the arrangement shown in FIG. 8. The wash pad 38 may then be rolled for storage upon the reel when the wash pad 38 is being transported to another site. The reel may be wound manually with a hand winch 86, or with an electric winch 70 as is shown in FIG. 8. FIG. 10 also shows a plank 88 extending between the trailer and the wash truck 10. The plank 88 allows the operator to access the washing equipment when necessary.

In use, the wash pad embodiment shown in FIG. 10 is unrolled from the reel 84 and attached with the attachment means 82 to the trailer being cleaned. The plank 88 is placed between the trailer and the wash truck 10 and the submersible pump 26 is placed upon the bottom sheet 40 of the wash pad 38. The interior of the trailer is then washed in a conventional manner with the used wash water 24 being directed from the trailer onto the wash pad 38. When the washing operation is complete and the used wash water 24 collected, the wash pad 38 may be disconnected from the trailer and rolled upon its reel 84 or attached to the next trailer to be cleaned.

It should be understood that the embodiments of the wash pad 38 depicted in FIGS. 5 and 6 may be used instead when cleaning articles such as the trailer interior. The trailer is simply situated over the wash pad 38 such that the used wash water 24 exiting the trailer collects within the containment area C.

(b) Shipping Container Wash

Figure 11:
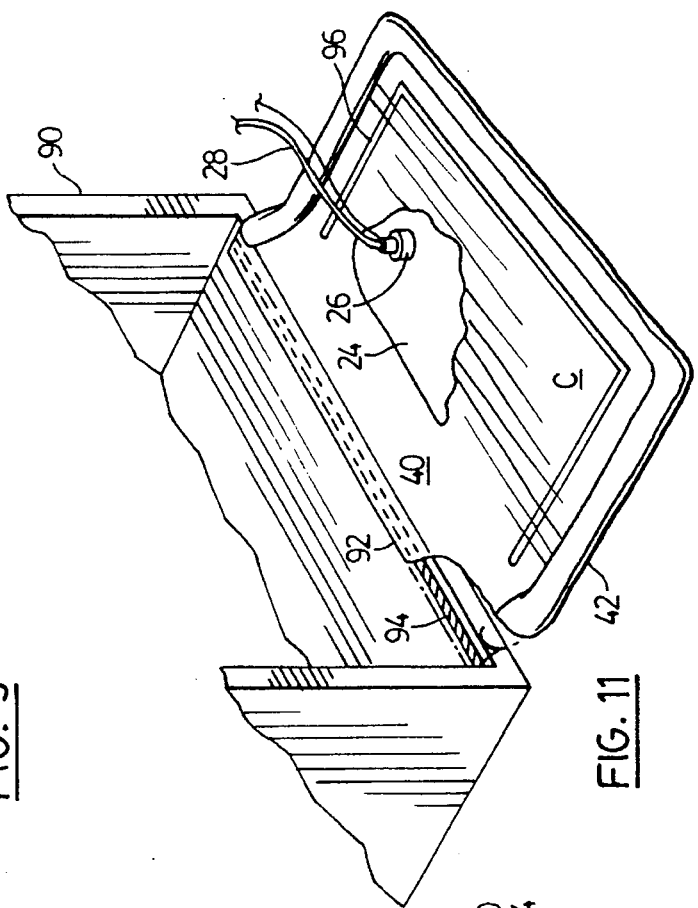
FIG. 11 is a partial perspective sectional view of the rear of a shipping container with another embodiment of a wash pad extending therefrom.

The wash pad 38 depicted in FIG. 11 may be used when washing shipping containers 90 or other articles that are located on or near to the ground. The wash pad 38 has a containment wall 42 and a bottom sheet 40 that are sealingly connected and together define a containment area C for collecting the used wash water 24. The wash pad 38 includes an attachment strip 92 extending along a portion of the bottom sheet 40 for attaching the wash pad 38 to the mouth of the shipping container. Magnets 94 are sewn along the length of the strip 92 to hold the wash pad 38 in place. Other attachments such as hooks, snaps, and the like may be used in addition to, or in replacement of, the magnetic attachments 94. The wash pad 38 may further include a weighted strip 96 to deter the wash pad 38 from being blown about by the wind.

In use, the wash pad 38 is attached with the attachment strip 92 to the mouth of the container being cleaned and the submersible pump 26 is placed upon the bottom sheet 40. The interior of the container is then washed in a conventional manner with the used wash water 24 being directed from the container onto the wash pad 38. When the washing operation is complete and the used wash water 24 collected, the wash pad 38 is detached from the container and folded or rolled for storage or attached to the next container to be cleaned.

(c) Rail-Mounted Article wash

Figure 14:
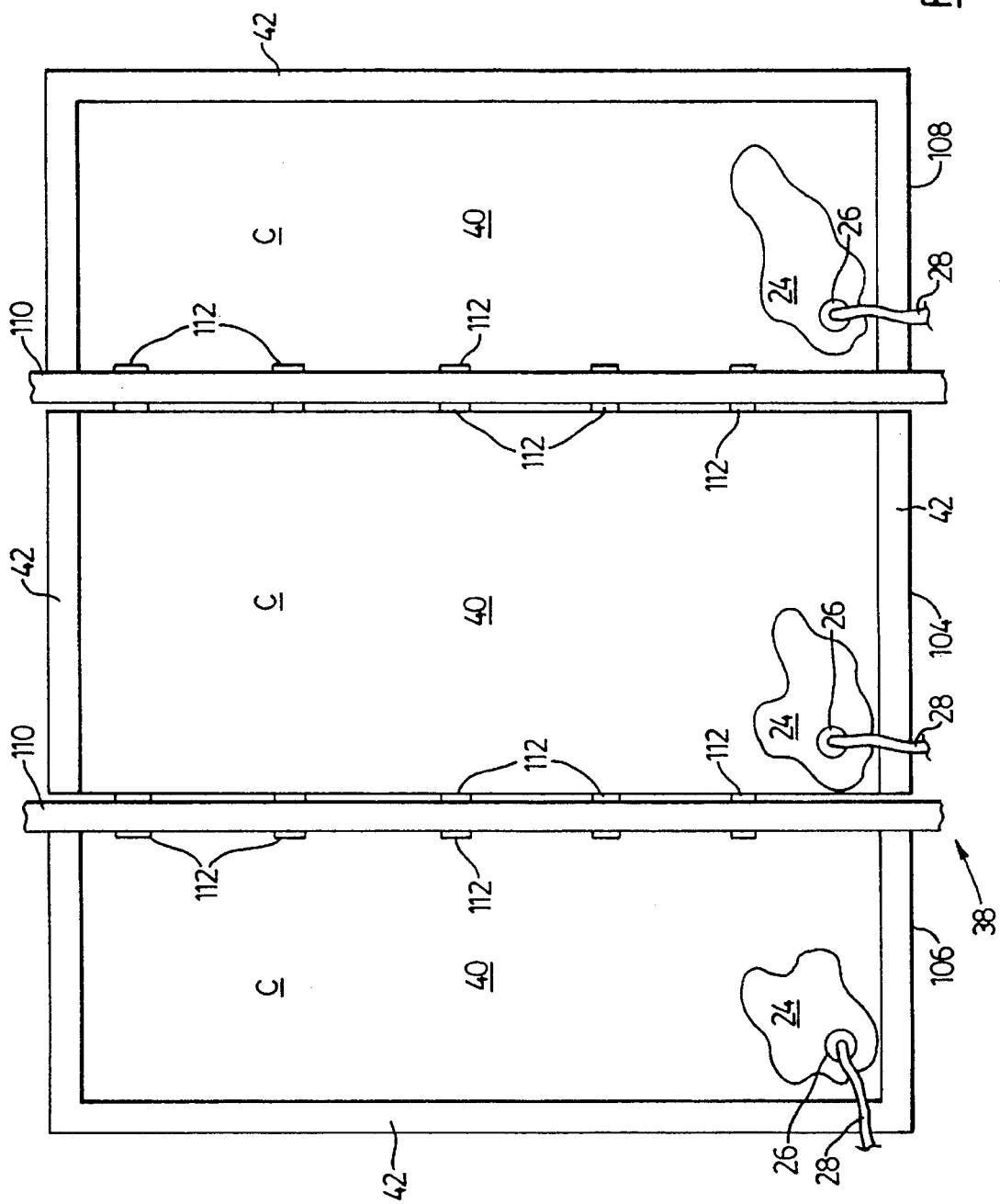
FIG. 14 is a top view of another embodiment of a wash pad having three portions arranged about a set of rails.

The wash pad 38 depicted in FIG. 14 may be used when washing rail-mounted articles, such as locomotives and rail cars. The wash pad 38 includes first, second and third portions 104, 106 and 108. The portions are unconnected although it is conceivable that a durable strapping may be used to connect these portions. Each portion 104, 106, 108 includes a bottom sheet 40 and containment walls 42 to define a containment area C for collecting the used wash water 24.

The first portion 104 is positioned between a set of rails 110. The second and third portions 106 and 108 are positioned on the outer sides of the rails 110 adjacent to the first portion 104. The first portion 104 fits snugly between the rails 110 and may be held in place with magnetic attachment means 112 if desired. Similarly, the second and third portions 106, 108 are positioned snugly adjacent the rails 110 and held in place with magnetic attachment means 112.

As depicted in FIG. 14, the containment walls 42, 44 extending alongside the rails 110 are not inflated or sponge filled. Instead, the bottom sheet 40 of the portions 104, 106, 108 are turned up and attached to the rails 110 with means 112. Alternatively, inflated or sponge walls similar to the remaining containment walls 42 may be provided along the rail-side of each portion if desired.

In use, a rail-mounted article is moved over the wash pad for washing. The used wash water 24 is collected with one or more submersible pumps 26 as described above. When the washing operation is complete and the used wash water collected, the wash pad 38 may be removed from the rails 110 for storage.

Operation of Wash Truck without wash Pad

In some instances, the articles being washed are situated at a site that has a water-proof surface 98, such as pavement. These areas often have drains 100 to draw away rain water collecting upon the surface. In such cases, it is often not necessary to use the wash pad 38 to contain the used wash water 24. Instead, a drain cover 102 as shown in FIG. 12 is used to cover the drains 100 and allow the used wash water 24 to collect upon the water-proof surface.

The site is adapted for washing by establishing a containment area C with a portable containment means 101, such as a water-inflated tube. The tube 101 provides a flexible barrier that is sufficiently heavy to provide a water-tight seal with the pavement 98. The tube 101 may thus be arranged in a configuration adjacent to the article being washed to prevent the used wash water 24 from spreading over a large area. The used wash water 24 is then drawn into the wash truck 10 with the removal means 26 described earlier.

Figure 12:
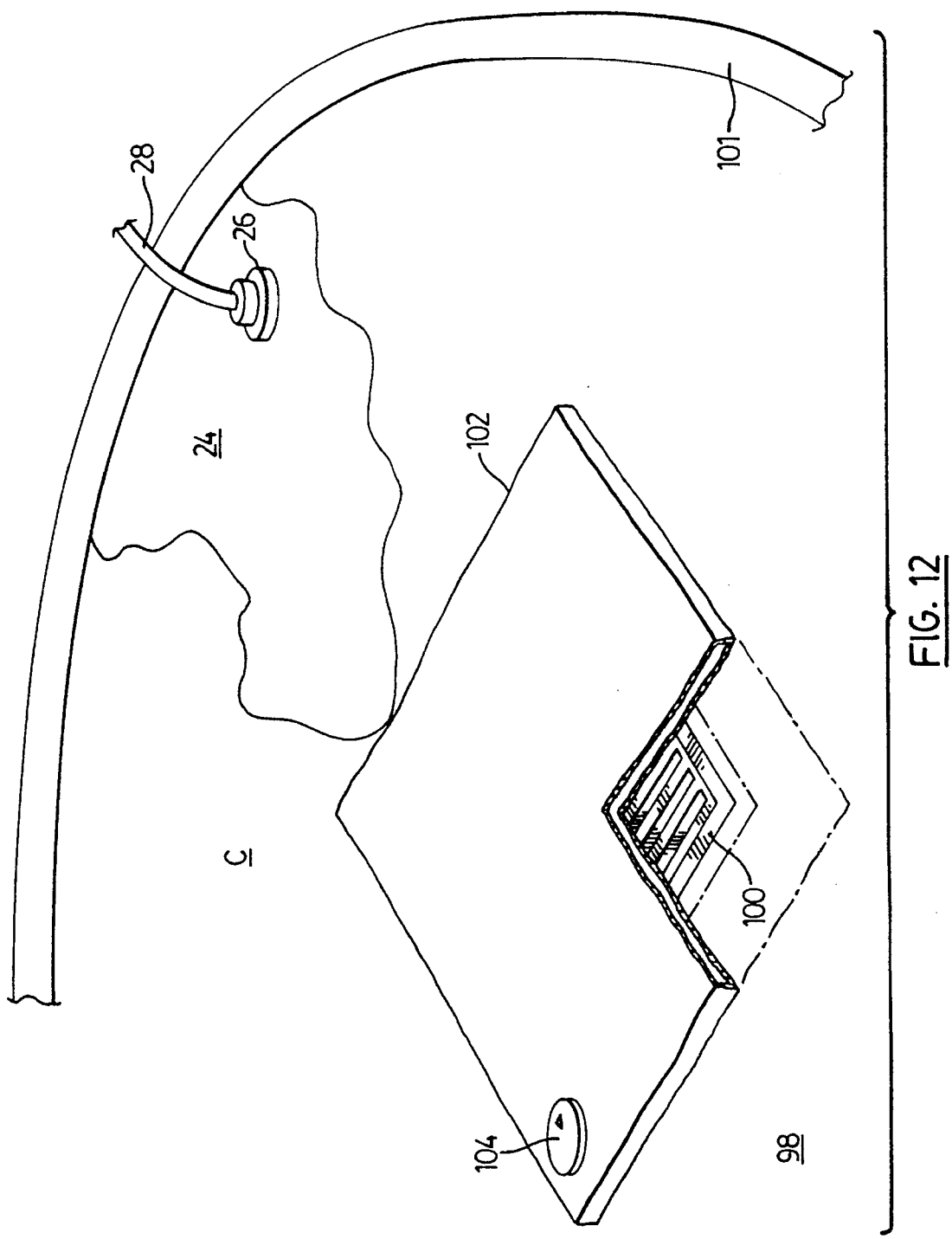
FIG. 12 is a partial sectional perspective view of a drain cover

The drain cover 102 depicted in FIG. 12 is a water filled bag. The bag is four feet square and is capable of holding fifty gallons of water supplied from the wash truck 10. The drain cover includes a releasable closure 104 for filling and emptying the bag. The large area bag has a weight of approximately five hundred pounds when inflated. An example of another suitable drain cover is provided in U.S. Pat. No. 4,838,732.

It is to be understood that what has been described are preferred embodiments of the invention. The invention nonetheless is susceptible to certain changes and alternative embodiments fully comprehended by the spirit of the invention as described above, and the scope of the claims set out below.

I claim:

1. A method for applying a fluid to an article at a site and collecting the used fluid, comprising the steps of:
   (a) providing a fluid application vehicle at said site, said vehicle having a fluid supply tank, a fluid applicator, a collection receptacle, and a containment pad rolled upon a containment pad reel, said containment pad having a fluid-impermeable bottom sheet and a containment wall sealingly connected to said bottom sheet, said wall and said bottom sheet together defining a containment area for containing used fluid;
   (b) deploying said containment pad from said reel;
   (c) applying said fluid to said article such that the used fluid is contained in said containment area; (d) removing said used fluid from said containment area with the removal means; and (e) transferring said used fluid with a conduit to said collection receptacle.

2. A method as claimed in claim 1 wherein, said collection receptacle comprises a fluid treatment unit and wherein, in step (e) the used fluid is transferred with said conduit to said fluid treatment unit.

3. A method as claimed in claim 2, wherein said article is another vehicle, and said containment pad includes at least one secondary wall sealingly connected to said bottom sheet, said at least one wall, said at least one secondary wall, and said bottom sheet together defining a second containment area for containing used fluid that flows from said first containment area when said other vehicle enters and exits said containment pad through said second containment area and over said at least one wall.

4. A method as claimed in claim 3, wherein an underlay sheet is provided beneath said containment pad to protect said containment pad from being punctured by sharp objects.

5. A method as claimed in claim 4, wherein said underlay sheet is rolled for storage upon an underlay reel mounted to said vehicle, said reel having a bracket that supports an axle.

6. An apparatus for use in applying a fluid to an article and collecting used fluid, comprising:
   a containment pad having a fluid-proof bottom sheet, and at least one fluid-proof wall in the form of an extended sheet integrally connected to said bottom sheet, said at least one wall and said bottom sheet providing a trough-like configuration to define a containment area;
   a containment pad reel for storing said containment pad, said reel having a bracket that supports an axle, with said containment pad being rolled about said axle, and said reel being mountable to a carrier;
   and an attachment means extending from said containment pad to such an article such that said containment pad extends between said article and said carrier in said trough-like configuration.

7. An apparatus as claimed in claim 6, wherein said carrier is a truck.

8. A mobile apparatus for applying a fluid to articles and collecting used fluid, said apparatus comprising:
   a vehicle;
   a fluid supply tank mounted to said vehicle;
   a fluid applicator mounted to said vehicle and fluidly connected to said tank;
   a used fluid receptacle mounted to said vehicle, said receptacle having an inlet;
   a flexible conduit fluidly connected to said inlet;
   removal means for collecting used fluid and conducting said used fluid through said conduit to said inlet; and
   a flexible containment pad removably stored upon a reel mounted to said vehicle, said containment pad having a fluid impermeable bottom sheet and at least one fluid impermeable wall sealingly connected to said bottom sheet, said at least one wall and said bottom sheet together defining a containment area for containing used fluid to be collected with said removal means.

9. A mobile apparatus as claimed in claim 8, wherein said receptacle is a wash water treatment unit for cleaning said used wash water.

10. A wash vehicle as claimed in claim 9, wherein said removal means is a submersible pump, and further comprising an electric generator mounted to said vehicle for powering said pump and said treatment unit.

* * * * *

UNITED STATES PATENT AND TRADEMARK OFFICE
CERTIFICATE OF CORRECTION

PATENT NO. : 5,560,782

DATED : October 1, 1996

INVENTOR(S) : Douglas Latimer

It is certified that error appears in the above-indentified patent and that said Letters Patent is hereby corrected as shown below:

At column 1, line 6, please replace "5423329" with -- 5423339 --.

Signed and Sealed this

Eleventh Day of February, 1997

Attest:

BRUCE LEHMAN

Attesting Officer

Commissioner of Patents and Trademarks